(12) United States Patent
Barzegar et al.

(10) Patent No.: US 7,535,891 B1
(45) Date of Patent: May 19, 2009

(54) METHODS AND SYSTEMS FOR CONVERTING SIGNALS

(75) Inventors: Farhad Barzegar, Branchburg, NJ (US); Irwin Gerszberg, Kendall Park, NJ (US); Thomas W. Hill, Succasunna, NJ (US); Scott J. Mollica, Red Bank, NJ (US)

(73) Assignee: AT&T Intellectual Property II, L.P., Bedminster, NJ (US)

( * ) Notice: Subject to any disclaimer, the term of this patent is extended or adjusted under 35 U.S.C. 154(b) by 858 days.

(21) Appl. No.: 10/748,959

(22) Filed: Dec. 30, 2003

(51) Int. Cl.
*H04L 12/66* (2006.01)

(52) U.S. Cl. ............................ 370/352; 370/261
(58) Field of Classification Search .................. 370/352, 370/493, 494; 375/220, 221, 222
See application file for complete search history.

(56) References Cited

U.S. PATENT DOCUMENTS

| | | | |
|---|---|---|---|
| 5,574,724 A * | 11/1996 | Bales et al. ................. | 370/410 |
| 6,272,209 B1 | 8/2001 | Bridger | |
| 6,292,840 B1 | 9/2001 | Blomfield-Brown | |
| 6,359,881 B1 | 3/2002 | Gerszberg | |
| 6,370,149 B1 | 4/2002 | Gorman | |
| 6,567,399 B1 | 5/2003 | Schuster | |
| 7,010,026 B1 * | 3/2006 | Hjartarson et al. .......... | 375/220 |
| 7,164,694 B1 * | 1/2007 | Nodoushani et al. ........ | 370/467 |
| 2001/0005379 A1 | 6/2001 | Pickett | |
| 2002/0031086 A1 | 3/2002 | Welin | |
| 2002/0038158 A1 * | 3/2002 | Hashimoto et al. ............ | 700/94 |
| 2003/0210677 A1 * | 11/2003 | Grove et al. ................ | 370/352 |
| 2004/0032860 A1 | 2/2004 | Mundra | |
| 2005/0015259 A1 | 1/2005 | Thumpudi | |
| 2005/0041603 A1 * | 2/2005 | Tighe et al. ................. | 370/260 |
| 2007/0053348 A1 | 3/2007 | Koistinen | |

FOREIGN PATENT DOCUMENTS

WO WO 0117219 A1 * 3/2001

OTHER PUBLICATIONS

Smyth et al, An Independent Evaluation of the Performance of the CCITT G.722 Wideband Coding Recommandation using Music Signals, Apr. 11, 1988, international conference, vol. 5, 2544-2547.*
Chen et al, Fast time-frequency transform algorithms and their applications to real-time software implementation of AC-3 audio codec, May 1998, IEEE transactions, vol. 44, 413-423.*
Santilli et al, split-band LD-CELP wideband speech coding at 24 Kbits/s, May 1991, university of Acona, Italy, 4 pages.*
Schulzrinne et al, Session Initiation Protocol (SIP)-H.323 Interworking Requirements, Feb. 19, 2003, Columbia University, 14 pages.*
U.S. Appl. No. 10/748,958, filed Dec. 30, 2003, Mollica.

* cited by examiner

*Primary Examiner*—Hassan Kizou
*Assistant Examiner*—Mounir Moutaouakil
(74) *Attorney, Agent, or Firm*—Michael Haynes PLC; Michael N. Haynes

(57) ABSTRACT

Certain exemplary embodiments provide a method, comprising: receiving, at a subscriber interface line card, an analog signal from a POTS subscriber loop circuit; quantizing the analog signal into a plurality of digital samples; encoding the plurality of digital samples via codec instructions running on a digital signal processor installed on the subscriber interface line card; and converting, via conversion instructions running on the digital signal processor, the encoded plurality of digital samples to a plurality of VoATM packets.

20 Claims, 3 Drawing Sheets

METHODS AND SYSTEMS FOR CONVERTING SIGNALS

BACKGROUND

U.S. Pat. No. 6,567,399 (Schuster), which is incorporated by reference herein in its entirety, allegedly cites a "high-fidelity voice/audio communication system including a high-fidelity SLIC (HSLIC) device that combines traditional BORSCHT functionality with high fidelity sampling and compression techniques. The HSLIC preferably resides on a single plug-in line card contained within a multi-cards chassis. The line card includes an analog interface that connects to a two-wire subscriber line, a high fidelity codec for sampling the analog signal at a high resolution and converting high rate digital signals to an analog signal, a voice processing client running on a microprocessor and associated digital memory. The high fidelity codec preferably has a sample rate of at least twenty thousand samples per second, and no less that 250 quantization levels. The voice processing client preferably includes an Internet Protocol (IP) processing client, Session Initiation Protocol (SIP) client, a Real Time Protocol (RTP) client, and other components of a communication protocol stack for establishing a connection over a packet based network by way of the network interface circuit. The line card establishes a high fidelity audio connection by sending an invite request to a proxy server; receiving an okay signal indicating that the request was received; sending an acknowledge signal; quantizing audio information at a sampling rate greater than twenty thousand samples per second with a resolution of no less than 4096 quantization levels; and, packetizing the quantized data for transmission to a remote device." See Abstract.

U.S. patent application No. 20020031086 (Welin), which is incorporated by reference herein in its entirety, allegedly cites a "metod of processing first and second record packets of real-time information includes computing for each packet a deadline interval and ordering processing of the packets according to the respective deadline intervals. A single-chip integrated circuit has a processor circuit and embedded electronic instructions forming an egress packet control establishing an egress scheduling list structure and operations in the processor circuit that extract a packet deadline intervals, place packets in the egress scheduling list according to deadline intervals; and embed a decoder that decodes the packets according to a priority depending on their deadline intervals." See Abstract.

U.S. Pat. No. 6,370,149 (Gorman), which is incorporated by reference herein in its entirety, allegedly cites a "telecommunication system includes a digital switch, a local loop coupling the digital switch to a subscriber location, wherein a segment of the local loop includes copper twisted pair and wherein an asymmetrical digital subscriber line is carried by the local loop, the asymmetrical digital subscriber line including a plurality of data packets capable of carrying a plurality of derived digital telephone lines. The telecommunication system further includes a subscriber unit coupled to the asymmetrical digital subscriber line. The subscriber unit monitors the content of at least one of the plurality of data packets, receives an off-hook signal in response to an action of a user, and initiates a first derived digital telephone line of the plurality of derived digital telephone lines in response to the off-hook signal." See Abstract.

U.S. Pat. No. 6,359,881 (Gerszberg), which is incorporated by reference herein in its entirety, allegedly cites a "new architecture capable of utilizing the existing twisted pair interface between customer premises equipment and an associated serving local switching office is used to provide a vast array of new services to customers. Using an intelligent services director (ISD) at the customer services equipment as an interface for the equipment to an existing twisted cable pair and a facilities management platform (FMP) at the serving local switching office as an interface to various networks and service opportunities, new services such as simultaneous, multiple calls (voice analog or digital), facsimile, Internet traffic and other data can be transmitted and received over the twisted cable pair by using digital subscriber loop transmission schemes. The new services include but are not limited to videophone, utility meter reading and monitoring, broadcasting and multicasting. The architecture provides for fault-tolerant, transparent interaction of components and services and supports a variety of standards for each level of the open systems interconnection layers and layers of TCP/IP. The FMP connects electronically or optically to the public switched telephone network, Internet backbone, a private Intranet as well as other possible network connections." See Abstract.

U.S. Pat. No. 6,272,209 (Bridger), which is incorporated by reference herein in its entirety, allegedly cites a "method, apparatus, and software for providing lifeline service during power failure affecting Customer Premises Equipment (CPE) in a Digital Subscriber Loop (DSL) arranged to carry voice traffic in band rather than on a separate analogue POTS band. The arrangement provides a reduced service, capable of supporting at least one voice call, to operate during such power failure and, where a single call is in progress during power failure, that call may be maintained during the transition from DSL to analogue POTS lifeline service. Where a call is in progress upon power restoration, the lifeline POTS service may be maintained until completion of the call so as not to interrupt a potential lifeline call." See Abstract.

BRIEF DESCRIPTION OF THE DRAWINGS

A wide variety of potential embodiments will be more readily understood through the following detailed description, with reference to the accompanying drawings in which.

SUMMARY

Figure 1:
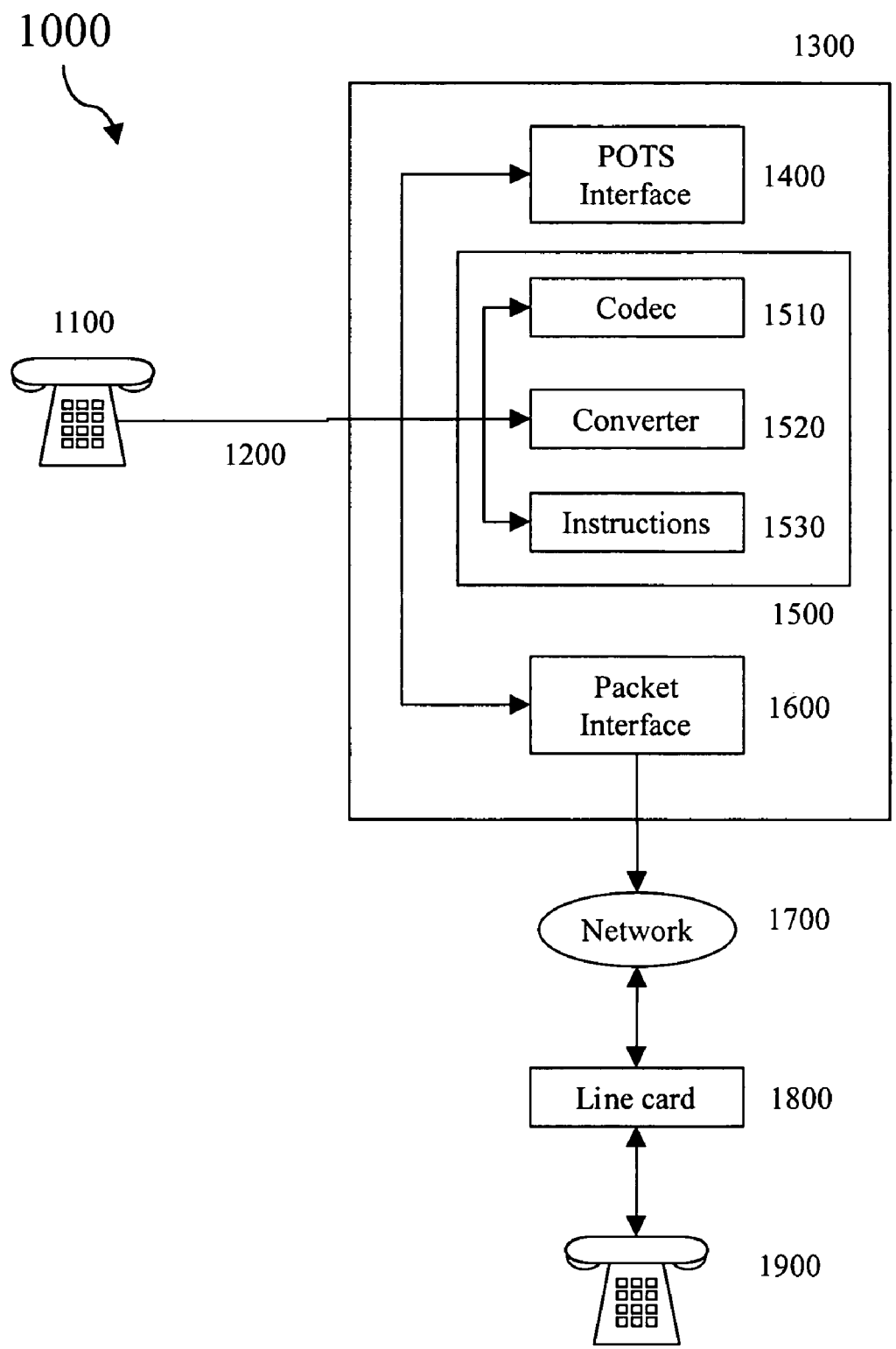
FIG. 1 is a block diagram of an examplary embodiment of a system 1000.

Certain exemplary embodiments provide a method, comprising: receiving, at a subscriber interface line card, an analog signal from a POTS subscriber loop circuit; quantizing the analog signal into a plurality of digital samples; encoding the plurality of digital samples via codec instructions running on a digital signal processor installed on the subscriber interface line card; and converting, via conversion instructions running on the digital signal processor, the encoded plurality of digital samples to a plurality of VoATM packets.

Certain examplary embodiments provide a method, comprising: receiving, at a subscriber interface line card, an analog signal from a POTS subscriber loop circuit; quantizing the analog signal into a plurality of digital samples; encoding, via high-quality audio codec instructions running on a digital signal processor installed on the subscriber interface line card, the plurality of digital samples; and converting, via conversion instructions running on the digital signal processor, the encoded plurality of digital samples into a plurality of VoATM packets.

DEFINITIONS

When the following terms are used herein, the accompanying definitions apply:

subscriber interface line card—a line card that interfaces to a subscriber loop circuit.

interface—(n.) a boundary across which two independent systems meet and act on or communication with each other. (v.) to connect with or interact with by means of an interface.

subscriber loop circuit—a plurality of wires that connect a telephone service provider's central office to the demarcation point on a customer's premises.

analog signal—a signal formed from continuous measurement and/or input.

POTS (plain old telephone service)—a basic analog service providing telephone lines and/or access to the public switched telephone network. Includes enhanced POTS.

converting—the act of transforming.

converter—a device that transforms.

software—instructions for operating a processor.

digital signal processor—a programmable digital microprocessor adaptable to perform calculations and/or manipulations on signals.

VoATM—voice over ATM.

VoIP—voice over IP.

VoP—voice over packet (e.g., VoATM, VoIP, etc.).

packet—a generic term for a collection of digital data comprised of information and associated header transmitted over a packet-switching network.

packet-switching—protocols in which messages are divided into packets and switching decisions are made based on the contents of the packet header.

packet interface—an interface to a packet-switching network.

digital—non-analog; discrete.

network—a communicatively-coupled plurality of communication devices.

sampling—the act of taking periodic measurements and/or readings of a continuous phenomena, such as an analog signal.

digitizing—the act of representing a sampled signal numerically.

encoding—the process of transforming a linear digital information stream into another digital data stream, such as for the purpose of maximizing information content as desired for a particular application, while minimizing the information rate (bandwidth) (eg. G.711, G.722, G.728, etc).

decoding—the act of transforming an encoded data stream to a linear data stream prior to an digital-to-analog conversion.

echo cancellation—a technique that isolates and filters unwanted signals caused by echoes from the main transmitted signal.

out-of-band signal—a signal that is separate from the main information bearing channel. An out-of-band signal can carry information regarding a called number, a calling number, and/or other signaling or supervisory information.

out-of-band packet format—a packet containing out-of-band signaling data.

DTMF (dual tone multiple frequency)—push button or Touchtone dialing.

BORSCHT functions—a group of functions provided to an analog subscriber loop circuit, and comprising the following functions: a Battery supply to the loop, Overvoltage protection, Ringing current supply, Supervision of subscriber terminal, Coder and decoder, Hybrid (2 wire to 4 wire conversion), and Test access.

remote terminal—a peripheral of a class 5 switch used to terminate a copper portion of a local loop that extends between a subscriber network interface device and the remote terminal location. The remote terminal can convert an analog signal for transmission on high speed digital facilities interconnecting the remote terminal and the class 5 switch.

central office—a telephone company building where subscriber's lines are joined to switching equipment for connecting to each other and/or other subscribers, locally and long distance.

switch—a mechanical, electrical, and/or electronic device that opens and/or closes circuits, completes and/or breaks an electrical path, and/or selects paths and/or circuits.

codec (coder/decoder)—a device that transforms a linear digital representation of a signal to/from a compressed representation of the analog signal.

PCM (pulse code modulation)—a method of compressing a set of digital samples. Include µ-law and A-law approaches.

far-end CPE—a called or calling CPE not directly served by the subscriber interface line card of interest.

high-quality audio—audio having a maximum frequency greater than 3.5 kHz.

automatically—acting or operating in a manner essentially independent of external influence or control. For example, an automatic light switch can turn on upon "seeing" a person in its view, without the person manually operating the light switch.

DETAILED DESCRIPTION

For the past 25 years, most telephony service (plain old telephone service or POTS) has been provided by a local exchange carrier (LEC) via a local loop or subscriber loop circuit (SLC) that extends from a subscriber line interface card (SLIC) in a central office of the LEC to a subscriber's premises. Once at the subscriber's premises, service can be provided to what is referred to as customer premises equipment (CPE). Traditional CPE reproduces audio in a frequency range from 300 Hz to 3.4 kHz. Yet, the human ear is capable of hearing beyond the frequency range of 5 Hz-18 kHz. At the line card, analog speech is converted to time division multiplexing (TDM), 64 kbps pulse-code modulation (PCM) voice. The quality of both traditional CPE and TDM PCM voice is inadequate, however, to meet current market demands for high quality voice. Moreover, most LEC's have a monopoly on providing local telephone service to subscribers in a given geographical area, and thus do not allow competitors to provide local telephone services to their subscribers.

In certain examplary embodiments, an electronic loop provisioning (ELP) line card that can convert analog speech to packet voice (e.g., VoATM, VoIP, etc.) can replace a traditional POTS line card at the central office (e.g., in a class 5 switch) or at a remote terminal of a switch.

The ELP line card can offer a traditional POTS Tip/Ring interface using commercially available SLIC's, such as a SLIC chipset. The SLIC can be configured for loop start or ground start applications. The SLIC can perform one or more BORSCHT functions (battery, over voltage protection, ringing, supervision, coding-decoding, hybrid and test functions).

The SLIC can handoff PCM encoded samples to the signal-processing block of the ELP line card. The ELP's signal processor, which can comprise instructions running on a digital signal processor (DSP) chip, can be responsible for encoding the PCM samples from the subscriber into an advantageously compressed format (such as ADPCM, LD-CELP, etc.) or passing the PCM encoded samples to a packet interface. Conversely, the signal processor can be responsible for expanding encoded samples from a packet network and delivering the samples to the SLIC where they can be converted into an analog format.

The ELP line card's signal processor can be responsible for performing echo cancellation and/or translating/interpreting any out-of-band signaling, or in-band, such as DTMF or modem/fax signals, to/from an out-of-band packet format where in-band signaling is not possible with a particular codec. The packet interface can be responsible for routing the subscriber signals over a backplane to a network interface card that is responsible for classification, queuing, and/or scheduling of packets on the network interface. The packet interface can be a proprietary implementation or can be a commercially available, standards-based, interface such as the ATM Utopia bus. The network interfaced card can be responsive for constructing/destructing packet traffic and delivering packets to the network interface. The network interface card can accept packet fragments, or entire packets, from the ELP line card and deliver packet fragments, or entire packets, to the ELP line card. The network interface can be optical fiber at the OC-3 or OC-12 rate, or can be T1 or DS3 for applications serving a small number of subscribers. The packet traffic can be ATM or Packet over SONET, (e.g., VoIP, MPLS). Other physical layer interfaces are not precluded by this architecture and may includes Gigabit Ethernet.

The ELP line card can be manufactured in various different modular arrangements, such as for example, 30-port cards, 50-port cards, and/or 4-port line cards that can reside in remote terminals located outside plant and/or remote terminals located inside plant.

The ELP line card can append an address header to the signals transmitted to an SLC. This address can allow packet switching to be used to deliver the signal to the switching office of one of a plurality of competitive access providers.

The ELP line card can convert analog speech to packet speech in the line card itself and/or can be backward compatible with traditional analog POTS interface. The packet speech can be an ATM or IP format. For example, the ELP's signal processor can encode and/or decode Voice over ATM (VoATM) and/or Voice over IP (VoIP). For purposes other than voice, the ELP line card can encode other high bandwidth formats.

For example, the ELP, the ELP's signal processor, and/or the instructions running on the ELP's signal processor can be leveraged to provide improved voice quality for baseband voice signals. For example, for certain calls, a 3.1 kHz POTS coder/decoder (codec) (ITU-T G.711) of the ELP, the ELP's signal processor, and/or the instructions running on the ELP's signal processor can be replaced, substituted, and/or upgraded with a higher bandwidth codec and/or a high quality voice codec such as a 7 kHz ITU-T G.722 codec, and/or a multi-channel codec, e.g., a Dolby Digital codec, and/or a DTS codec. The G.722 codec can provide a 64 kbps bitstream but can encode/decode voice over a 7 kHz bandwidth resulting in a higher voice quality using the same amount of network bandwidth as a traditional POTS connection.

The ELP, the ELP's signal processor, and/or the instructions running on the ELP's signal processor can also comprise a POTS 3.1 kHz ITU-T G.711 codec. The ELP, the ELP's signal processor, and/or the instructions running on the ELP's signal processor can switch automatically between one or more high quality audio codecs and the POTS codec depending on the capabilities of the CPE at either end of the call and/or depending on the capabilities of the network.

The ELP packet infrastructure can be leveraged to provide high quality encoding/decoding for both "on-net to on-net" calls and calls for "on-net to off-net" calls through interworking with ISDN for negotiation of bearer capabilities between the called and calling parties. For the on-net to on-net case, the ELP packet network can be utilized in the access network for the originating and terminating portions of the call. The packet network described in both the access and transport portions of the network does not necessarily imply a particular type of packet network. The underlying packet network can be capable of providing the required QoS to the packet flows carrying active calls. The underlying packet network can be IP or ATM.

It is recognized that traditional POTS customer premises equipment (CPE) can be used to reproduce audio in the frequency range from 300 Hz to 3.4 kHz, yet the human ear is capable of hearing within and/or beyond the frequency range of about 5 Hz to about 18 kHz.

Thus, two types of intelligent CPE are described herein. Type 1 CPE can be used with the ELP line card, described herein, which can be used to provide a high quality voice capability for traditional PSTN telephony equipment (i.e., TDM). The Type 1 CPE can be used to reproduce high fidelity voice signals sent between CPE. The Type 1 CPE can reproduce a frequency range that is wider than the 3.1 kHz bandwidth traditional CPE is capable of reproducing, and potentially in or beyond a range of about 5 Hz to about 18 kHz. This can be accomplished by using high quality, high fidelity components such as speakers and/or microphones in the CPE design. The wideband telephony signal can be provided on the POTS copper interface by either an increased baseband bandwidth or modulation of the telephony signal using DSL techniques. The Type 1 CPE can be capable of exchanging signals with the network so the network can verity a subscriber is using an intelligent CPE. In the absence of an acknowledgment from either the originating or terminating CPE, the network can default to traditional POTS signal processing. Alternatively, provided the originating customer is subscribed to enhanced voice services, the network can use SS7 to query a server to determine if the terminating subscriber is also an enhanced services subscriber. If the terminating subscriber also subscribes to enhanced services then the call can use a wideband codec (e.g., G.722), otherwise, the call can default to traditional POTS signal processing.

A Type 2 CPE can be used with packet networks. In this implementation, the intelligent CPE can perform the functions of the Type 1 CPE including the ability to reproduce high fidelity audio, as well as the functions of the intelligent line card. In this implementation, the telephone can have an IP interface.

In the following paragraphs, several different types of calls are described to illustrate that enhanced services can be offered to different types of subscribers while remaining interoperable with existing PSTN and future packet networks.

IP Centrex/IP PBX

Certain exemplary embodiments can be implemented on IP Centrex or PBX based office networks. The main difference between IP and non-IP implementations of Centrex PBX is that IP implementations can utilize intelligent CPE with an IP interface. The intelligent CPE is capable of negotiating a high fidelity voice call with other intelligent CPE that are part of the office network or even with intelligent CPE that are part of a different office network. The intra-office application of high quality audio can also be the simplest implementation of this technology since interworking with the PSTN is not necessarily required for calls within the IP Centrex or PBX network. In the latter, a call placed between two intelligent CPE that are not members of the same network can use interworking across a public network. This can be achieved through interworking across the existing PSTN or future packet networks.

PSTN Interworking for High Quality Audio

Calls placed between intelligent CPE that involve PSTN interworking can utilize either of two different methods. The first method involves interworking with intelligent CPE that are placed on high quality voice enabled line cards. These line cards can replace the traditional POTS line card at the central office class 5 switch, or can replace the line cards at a remote terminal of the class 5 switch. The high quality audio line card and/or ELP line card can include an enhanced codec that is compatible with traditional POTS line cards and the line card can slot support an enhanced mode based on G.722. For calls placed between the high quality audio-enabled subscriber, with intelligent CPE, and a non-high quality audio-enabled subscriber, the line card can fall-back on traditional POTS processing (i.e. G.711). For calls between intelligent CPE in a high quality audio-enabled network, the intelligent line card can utilize a high quality codec based on the bearer capability available to carry the call. In the TDM PSTN network, the basic bearer is a 64 kbps DS0 trunk. For ISDN BRI calls it is possible to utilize both the A and B channels to provide a 128 kbps bearer channel.

Packet Interworking for High Quality Audio

Packet mode interworking between intelligent CPE can make it possible for service providers to offer a wide variety of high quality audio services that can be useful for business and/or residential subscribers. Services can include high-bandwidth codecs and bearer channels that are not restricted by the 64 kbps limitations of the PSTN. Services can include enhanced quality voice circuits using G.722 encoding or can encode multiple channel audio such as Dolby Digital or DTS. A packet network such as the network described for Electronic Loop Provisioning can provide the underlying packet network to deliver varying packet rates and/or quality of service for high quality voice connections.

PSTN/Packet Interworking

Calls between enhanced voice subscribers that are on high quality audio-enabled networks where one subscribes to a PSTN implementation and another subscribes to a packet implementation are also possible. In this scenario, the packet CPE can negotiate the highest possible bearer bandwidth and codec each network is capable of supporting. In this case, a 64 kbps voice trunk can be used on the PSTN (TDM) portion of the network and can terminate on a high bandwidth codec (e.g., G.722). The packet portion of the call can be from the packet CPE to a PSTN gateway. The PSTN gateway can convert the packet stream to a TDM bitstream. Signaling between the intelligent CPE/line card can be accomplished either in-band or using SS7 services.

FIG. 1 is a block diagram of an examplary embodiment of a system 1000, which can comprise a POTS CPE 1100, such as a traditional telephone, fax, etc. CPE 1100 can be coupled to a POTS subscriber loop circuit 1200, which can be coupled to a subscriber interface line card (SLIC) 1300, which can be adapted to be installed in a central office, central office switch, remote terminal of a central office switch, etc., to potentially simultaneously support legacy CPE and electronic loop provisioning. Integral to SLIC 1300 can be a POTS subscriber loop circuit interface 1400 and a digital signal processor (DSP) 1500. Interface 1400 and DSP 1500 can be interconnected. Interface 1400 can provide one or more BORSHCT functions. DSP 1500 can comprise a codec portion 1510, a converter portion 1520, and/or instructions 1530. Alternatively, instructions 1530 can be coupled to DSP 1500.

Coupled to SLIC 1300 and/or DSP 1500 can be a packet network interface 1600, which can be coupled to a packet network 1700, such as an ATM and/or IP network. Coupled to packet network 1700 can be one or more additional line cards 1800 and associated CPE 1900.

Figure 2:
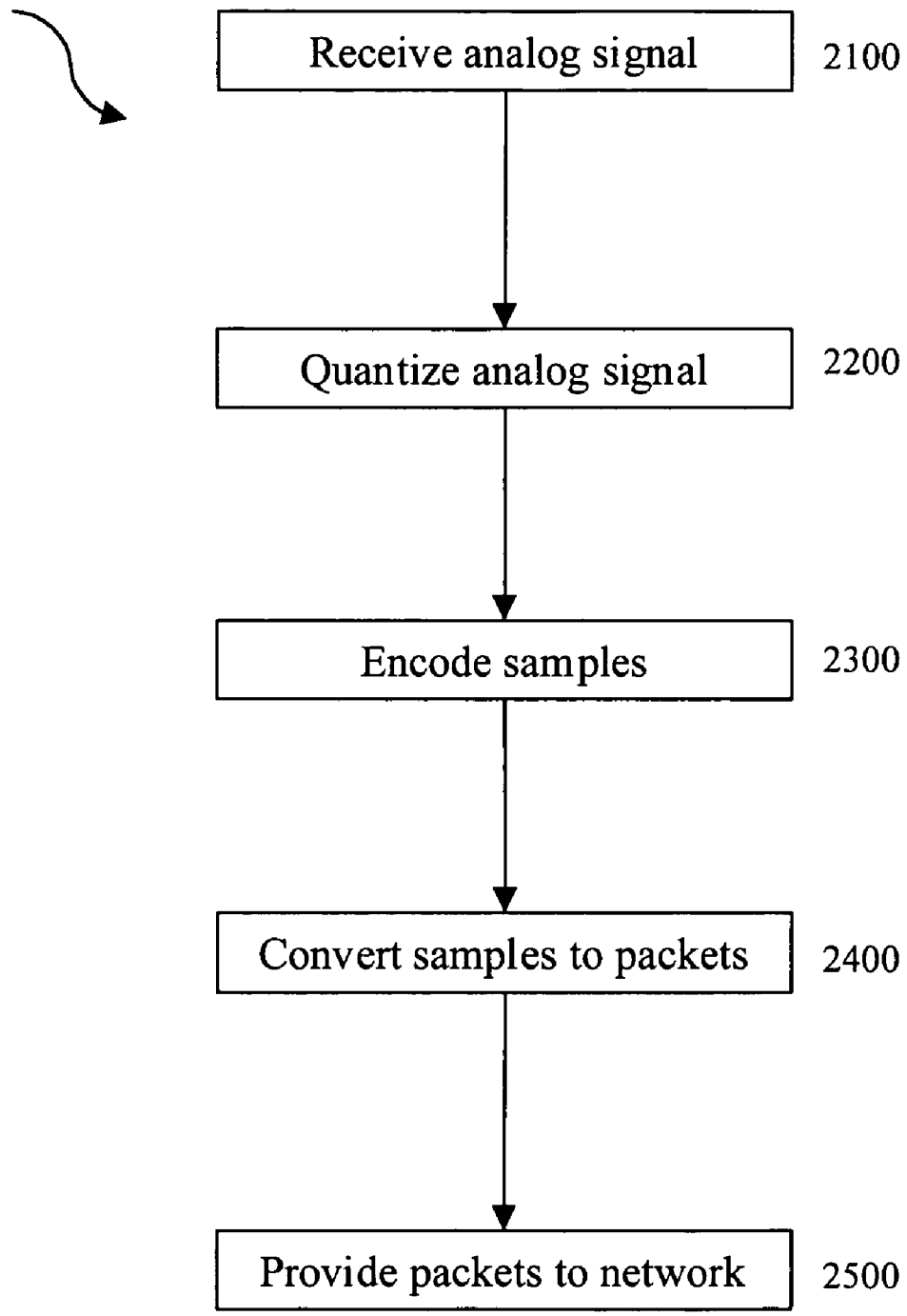
FIG. 2 is a flow diagram of an examplary embodiment of a method 2000.
Figure 3:
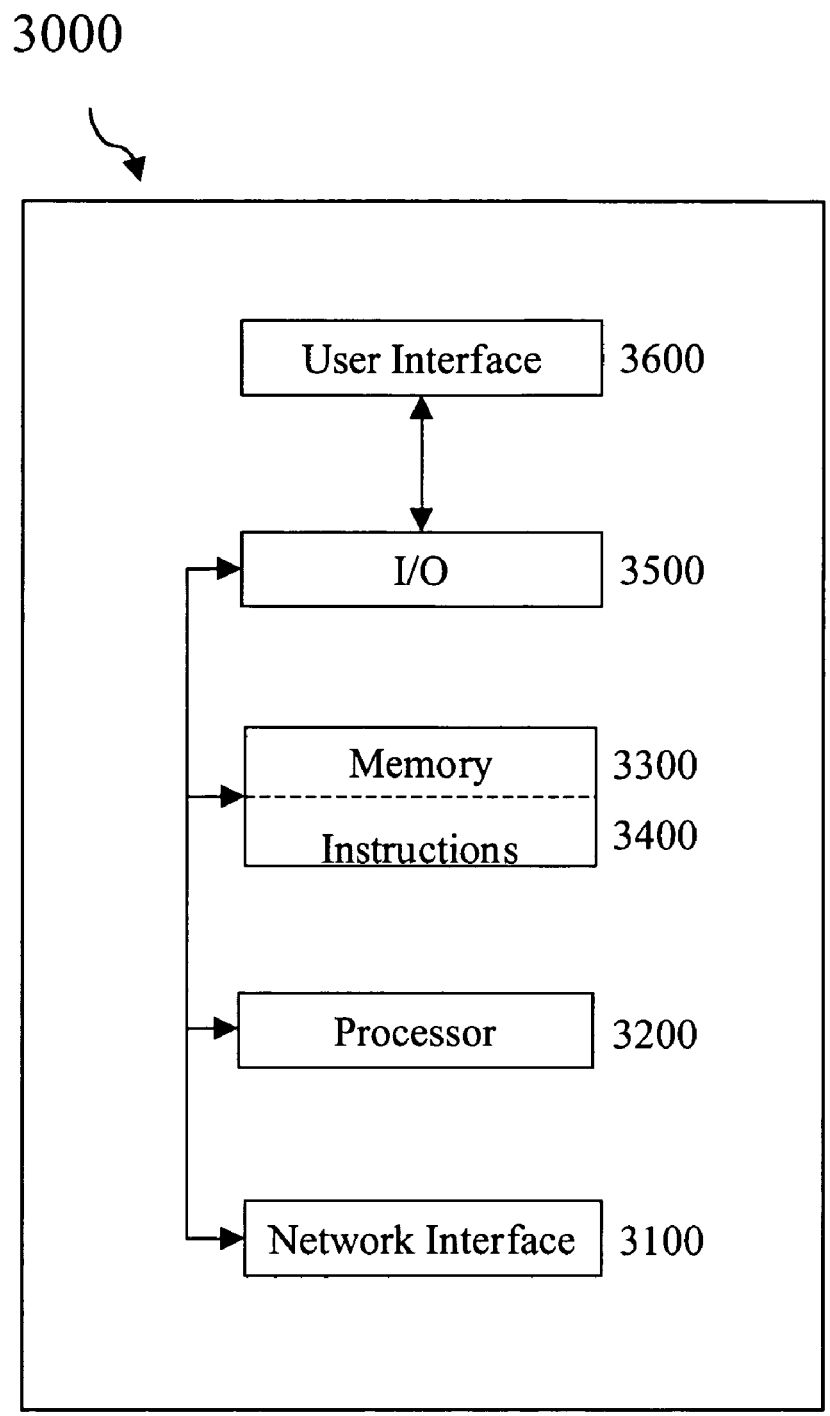
FIG. 3 is a block diagram of an examplary embodiment of an information device 3000.

FIG. 2 is a flow diagram of an exemplary embodiment of a method 2000. At activity 2100, an analog signal can be received from a POTS subscriber loop circuit at a subscriber interface line card (SLIC).

At activity 2200, the SLIC can quantize the analog signal into a plurality of digital samples. To do so, the SLIC can sample the received analog signal into a plurality of samples, and digitize the plurality of samples.

At activity 2300, codec instructions running on a digital signal processor (DSP) installed on the SLIC can encode the digital samples. In doing so, the instructions can compress and/or modulate the digital samples. Moreover, certain instructions of the DSP can provide echo cancellation; echo suppression; comfort noise suppression, pulse-code modulating; out-of-band conversion (e.g., conversion of DTMF, fax, etc. singals) to a packet and/or out-of-band packet format; and/or conversion to an out-of-band packet format; etc.

In certain examplary embodiments, the codec instructions can be high-quality audio codec instructions that are compatible with protocols such as the ITU G series (e.g., G.722, G.723, G.728, G.729, etc.), Dolby Digital AC-3, DTS, etc. In certain exemplary embodiments, the codec instructions can encode multiple channel audio.

In certain examplary embodiments, the SLIC and/or the network can determine a capability of a far-end CPE (its line card and/or the interconnecting network). If the far-end CPE (its line card and/or the interconnecting network) does not have high-quality audio codec capability, the SLIC can automatically substitute PCM codec instructions and/or POTS audio codec instructions for the high-quality audio codec instructions.

In certain examplary embodiments, the SLIC can substitute a different high-quality audio codec based on a capability of a far-end CPE (its line card and/or the interconnecting network). For example, the SLIC can assume a default high-quality audio codec capability of G.722, but upon learning that the far-end CPE can handle Dolby Digital AC-3, can automatically substitute the Dolby Digital AC-3 codec for the G.722 codec and proceed accordingly.

In certain exemplary embodiments, the determination of the capability of a far-end CPE and/or its line car can occur via signaling between the SLIC and the CPE and/or its line card. In certain examplary embodiments, the SLIC can provide its capabilities to the far end CPE and/or its line card.

At activity 2400, conversion instructions running on the DSP can convert the encoded digital samples to a plurality of packets, such as ATM, VoATM, IP, and/or VoIP packets.

At activity 2500, the packets can be provided to a packet network, such as via a packet interface.

Still other embodiments will become readily apparent to those skilled in this art from reading the above-recited detailed description and drawings of certain examplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirements for the inclusion in any claim of the application of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United State patent application, book article, etc.) that has been incorporated by reference herein, is only incorporated by reference to the extent that no conflict exists between such information and the other statements and drawings set forth herein. In the event of such conflict, including a conflict that would render a claim invalid, then any such conflicting information in such incorporated by reference material is specifically not incorporated by reference herein.

What is claimed is:

1. A method, comprising:
receiving, at a subscriber line interface card chipset of an electronic loop provisioning line card, an analog signal from a POTS subscriber loop circuit, the subscriber line interface card chipset adapted to handoff pulse code modulated samples to a digital signal processing chip of the electronic loop provisioning line card, the digital signal processing chip adapted to encode the pulse code modulated samples into a compressed format, the compressed format a low delay code excited linear prediction format, the digital signal processing chip adapted to expand encoded samples from a packet network and delivering samples to the subscriber line interface card chipset, the subscriber line interface card chipset adapted to convert the delivered samples to an analog format the electronic loop provisioning line card adapted to utilize an enhanced mode, the enhanced mode adapted to use a codec specified in G.722 as a default codec;
automatically determining that customer premises equipment accommodates a Dolby Digital AC-3 signal;
responsive to said determination that custom premises equipment accommodates said Dolby Digital AC-3 signal, automatically substituting a Dolby Digital AC-3 codec for the G.722 codec;
via the enhanced mode, quantizing the analog signal into a plurality of digital samples;
running said Dolby Digital AC-3 codec on a signal processor installed on the electronic loop provisioning line card;
encoding the plurality of digital samples via said Dolby Digital AC-3 codec; and
converting, via conversion instructions running on the digital signal processor, the encoded plurality of digital samples to a plurality of VoATM packets.

2. The method of claim 1, further comprising:
sampling the received analog signal into the plurality of samples, the digital signal processing chip of the subscriber line interface card adapted to encode Voice over ATM and Voice over IP.

3. The method of claim 1, further comprising:
digitizing the plurality of samples obtained from the received analog signal.

4. The method of claim 1, further comprising:
providing a destination address to each of the plurality of VoATM packets, the line card adapted to append an address header to signals transmitted to a subscriber loop circuit.

5. The method of claim 1, further comprising:
providing the plurality of VoATM packets to a VoATM packet interface.

6. The method of claim 1, further comprising:
via instructions running on the digital signal processor, performing echo cancellation on the encoded plurality of digital samples.

7. The method of claim 1, further comprising:
via instructions running on the digital signal processor, performing echo suppression on the encoded plurality of digital samples, the line card adapted to switch automatically between the codec specified in G.722 and a POTS codec based upon capabilities of customer premises equipment.

8. The method of claim 1, further comprising:
via instructions running on the digital signal processor, compressing the plurality of digital samples, the line card adapted to switch automatically between the codec specified in G.722 and a POTS codec based upon network capabilities.

9. The method of claim 1, further comprising:
via instructions running on the digital signal processor, modulating the plurality of digital samples, the line card adapted to encode the plurality of digital samples into an ADPCM format.

10. The method of claim 1, further comprising:
via instructions running on the digital signal processor, pulse-code-modulating the plurality of digital samples, the line card adapted to encode the plurality of digital samples into an LD-CELP format.

11. The method of claim 1, further comprising:
via instructions running on the digital signal processor, converting an out-of-band signal associated with the analog signal to an out-of-band packet format.

12. The method of claim 1, further comprising:
via instructions running on the digital signal processor, converting an out-of-band DTMF signal associated with the analog signal to an out-of-band packet format.

13. The method of claim 1, further comprising:
via instructions running on the digital signal processor, converting an out-of-band fax signal associated with the analog signal to an out-of-band packet format.

14. The method of claim 1, further comprising:
via instructions running on the digital signal processor, converting a voice-band modem signal associated with the analog signal to an out-of-band packet format.

15. The method of claim 1, further comprising:
via instructions running on the digital signal processor, suppressing comfort noise samples associated with the analog signal.

16. The method of claim 1, wherein the electronic loop provisioning line card is adapted to be installed at a central office to simultaneously support legacy CPE and electronic loop provisioning, the electronic loop provisioning line card adapted to receive a signal indicative of a highest possible bearer bandwidth and codec that a network is capable of supporting, said Dolby Digital AC-3 codec selected based upon said signal indicative of said highest possible bearer bandwidth and codec.

17. The method of claim 1, wherein the electronic loop provisioning line card is adapted to be installed in a central office switch, the electronic loop provisioning line card adapted to interwork with ISDN to negotiate bearer capabilities between calling and called parties.

18. The method of claim 1, wherein the electronic loop provisioning line card is adapted to be installed in a remote terminal of a central office switch, the electronic loop provisioning line card adapted to receive a response to a query of a server, the query to the server to determine if a terminating subscriber is an enhanced services subscriber.

19. An electronic loop provisioning line card comprising:
a POTS subscriber loop circuit interface adapted to receive an analog signal from a POTS subscriber loop circuit and quantize the analog signal into a plurality of digital samples, the line card adapted to receive a signal that customer premises equipment accommodates a Dolby Digital AC-3 signal, the line card adapted to utilize an enhanced mode, the enhanced mode adapted to use a codec specified in G.722, the subscriber line interface card chipset adapted to handoff pulse code modulated samples to a digital signal processing chip of the electronic loop provisioning line card, the digital signal processing chip adapted to encode the pulse code modulated samples into a compressed format, the compressed format a low delay code excited linear prediction format, the digital signal processing chip adapted to expand encoded samples from a packet network and delivering samples to the subscriber line interface card chipset, the subscriber line interface card chipset adapted to convert the delivered samples to an analog format, the electronic loop provisioning line card adapted to automatically substitute a Dolby Digital AC-3 codec for the G.722 codec responsive to said signal;
the Dolby Digital AC-3 codec stored on the electronic loop provisioning line card, the Dolby Digital AC-3 codec adapted to run on a signal processor coupled to the POTS subscriber loop circuit interface, the Dolby Digital AC-3 codec adapted to encode the plurality of digital samples; and
conversion instructions stored on the electronic loop provisioning line card, adapted to run on the digital signal processor, and adapted to convert the encoded plurality of digital samples to a plurality of VoATM packets.

20. A machine-readable medium storing instructions for activities comprising:
receiving, at an electronic loop provisioning line card, an analog signal from a POTS subscriber loop circuit, the line card adapted to utilize an enhanced mode, the enhanced mode adapted to use a codec specified in G.722 the subscriber line interface card chipset adapted to handoff pulse code modulated samples to a digital signal processing chip of the electronic loop provisioning line card, the digital signal processing chip adapted to encode the pulse code modulated samples into a compressed format, the compressed format a low delay code excited linear predication format, the digital signal processing chip adapted to expand encoded samples from a packet network and delivering samples to the subscriber line interface card chipset, the subscriber line interface card chipset adapted to convert the delivered samples to an analog format;
automatically determining that customer premises equipment accommodates a Dolby Digital AC-3 signal;
responsive to said determination that customer premises equipment accommodates said Dolby Digital AC-3 signal, automatically substituting a Dolby Digital AC-3 codec for the G.722 codec;
via the enhanced mode, quantizing the analog signal into a plurality of digital samples;
running said Dolby Digital AC-3 codec on a signal processor installed on the electronic loop provisioning line card;
encoding the plurality of digital samples via said Dolby Digital AC-3 codec; and
converting, via conversion instructions running on the digital signal processor, the encoded plurality of digital samples to a plurality of VoATM packets.

* * * * *